United States Patent
Kwak et al.

(10) Patent No.: US 11,510,231 B2
(45) Date of Patent: Nov. 22, 2022

(54) METHOD FOR TRANSMITTING OR RECEIVING DOWNLINK DATA AND DEVICE THEREFOR

(71) Applicant: LG Electronics Inc., Seoul (KR)

(72) Inventors: Kyuhwan Kwak, Seoul (KR); Seungmin Lee, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/982,245

(22) PCT Filed: Apr. 18, 2019

(86) PCT No.: PCT/KR2019/004692
§ 371 (c)(1),
(2) Date: Sep. 18, 2020

(87) PCT Pub. No.: WO2019/203590
PCT Pub. Date: Oct. 24, 2019

(65) Prior Publication Data
US 2021/0160906 A1    May 27, 2021

Related U.S. Application Data

(60) Provisional application No. 62/670,074, filed on May 11, 2018, provisional application No. 62/660,220, filed on Apr. 19, 2018.

(51) Int. Cl.
*H04W 72/12* (2009.01)
*H04W 72/04* (2009.01)
*H04W 72/14* (2009.01)

(52) U.S. Cl.
CPC ..... *H04W 72/1273* (2013.01); *H04W 72/042* (2013.01); *H04W 72/0446* (2013.01); *H04W 72/14* (2013.01)

(58) Field of Classification Search
CPC ........... H04W 72/1273; H04W 72/042; H04W 72/0446; H04W 72/14
USPC ........................................................ 370/336
See application file for complete search history.

(56) References Cited

U.S. PATENT DOCUMENTS

2017/0171842 A1    6/2017   You et al.
2019/0313385 A1*   10/2019  Yang .................... H04L 1/0067

OTHER PUBLICATIONS

Ericsson, "SPDCCH demodulation requirements for sTTI," R4-1802368, 3GPP TSG-RAN WG4 Meeting #86, Athens, Greece, dated Feb. 26-Mar. 2, 2018, 9 pages.
(Continued)

*Primary Examiner* — Peter G Solinsky
(74) *Attorney, Agent, or Firm* — Fish & Richardson P.C.

(57) ABSTRACT

The present invention provides a method for receiving downlink data by a terminal in a wireless communication system. Specifically, the method may comprise: receiving, in a first transmission time interval (TTI), downlink control information (DCI) for scheduling the downlink data repeatedly transmitted in a plurality of TTIs; obtaining rate matching information for the downlink data from the DCI; and receiving the downlink data in the first TTI and a second TTI subsequent to the first TTI on the basis of the rate matching information, wherein the first TTI and the second TTI are included in the plurality of TTIs.

13 Claims, 15 Drawing Sheets

(56) References Cited

OTHER PUBLICATIONS

Mediatek Inc., "Clarification for sPDSCH rate matching behavior with two SPDCCH PRB set," R1-1805087, 3GPP TSG RAN WG1 #92bis, dated Apr. 16-20, 2018, 6 pages.

PCT International Search Report and Written Opinion in International Application No. PCT/KR2019/004692, dated Jul. 26, 2019, 20 pages (with English translation).

Samsung, "Corrections on Rate Matching," R1-1804382, 3GPP TSG RAN WG1 Meeting #92bis, Sanya, China, dated Apr. 16-20, 2018, 4 pages.

ZTE, Sanechips, "Discussion on PDSCH repetition for LTE URLLC," R1-1803962, 3GPP TSG RAN WG1 Meeting #92bis, Sanya, China, dated Apr. 16-20, 2018, 6 pages.

\* cited by examiner (A) CONTROL-PLANE PROTOCOL STACK (B) USER-PLANE PROTOCOL STACK (a) 1TX or 2TX (b) 4 TX (a)

(b)

(a)

(b)

(a)

(b)

METHOD FOR TRANSMITTING OR RECEIVING DOWNLINK DATA AND DEVICE THEREFOR

CROSS-REFERENCE TO RELATED APPLICATIONS

This application is a National Stage application under 35 U.S.C. § 371 of International Application No. PCT/KR2019/004692, filed on Apr. 18, 2019, which claims the benefit of U.S. Provisional Application No. 62/670,074, filed on May 11, 2018, and U.S. Provisional Application No. 62/660,220, filed on Apr. 19, 2018. The disclosures of the prior applications are incorporated by reference in their entirety.

BACKGROUND

Field

The present disclosure relates to a method and apparatus for transmitting or receiving downlink (DL) data, and more particularly, to a method and apparatus for transmitting or receiving a repeatedly transmitted DL data channel based on rate-matching information included in downlink control information (DCI).

Discussion of the Related Art

A brief description will be given of a $3^{rd}$ generation partnership project long term evolution (3GPP LTE) system as an example of a wireless communication system to which the present disclosure may be applied.

FIG. 1 illustrates a configuration of an evolved universal mobile telecommunications system (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a user equipment (UE), an evolved Node B (eNode B or eNB), and an access gateway (AG) which is located at an end of an Evolved UMTS terrestrial radio access network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides downlink (DL) or uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, hybrid automatic repeat request (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A core network (CN) may include an AG and a network node for user registration of UEs. The AG manages the mobility of UEs on a tracking area (TA) basis. A TA includes a plurality of cells.

While the development stage of wireless communication technology has reached LTE based on wideband code division multiple access (WCDMA), the demands and expectations of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

SUMMARY

Provided is a method and apparatus for transmitting or receiving a downlink data channel.

It will be appreciated by persons skilled in the art that the objects that could be achieved with the present disclosure are not limited to what has been particularly described hereinabove and the above and other objects that the present disclosure could achieve will be more clearly understood from the following detailed description.

According to another embodiment of the disclosure, a method of receiving downlink data by a user equipment (UE) in a wireless communication system includes receiving downlink control information (DCI) in a first transmission time interval (TTI), the DCI scheduling repeated transmissions of downlink data in a plurality of TTIs, obtaining rate-matching information for the downlink data from the DCI, and receiving the downlink data in the first TTI and a second TTI subsequent to the first TTI based on the rate-matching information. The first TTI and the second TTI are included in the plurality of TTIs.

The rate-matching information may be for indicating a control resource block (RB) set to which the downlink data is not mapped.

Further, the rate-matching information may be for indicating a resource region to which the downlink data is not mapped in a control RB set configured for the first TTI.

Further, the resource region may be indicated in units of a control channel element (CCE).

Further, when the DCI is received on a physical downlink control channel (PDCCH) other than a short PDCCH, the downlink data may be received in the first TTI and the second TTI based on a rate-matching mode signaled by a higher layer.

Further, the first TTI and the second TTI may be short TTIs.

According to an embodiment of the disclosure, an apparatus for receiving downlink data in a wireless communication system includes a memory and at least one processor coupled to the memory. The at least one processor controls reception of DCI in a first TTI, the DCI scheduling repeated transmissions of downlink data in a plurality of TTIs, obtaining of rate-matching information for the downlink data from the DCI, and reception of the downlink data in the first TTI and a second TTI subsequent to the first TTI based on the rate-matching information. The first TTI and the second TTI are included in the plurality of TTIs.

The rate-matching information may be for indicating a control RB set to which the downlink data is not mapped.

Further, the rate-matching information may be for indicating a resource region to which the downlink data is not mapped in a control RB set configured for the first TTI.

Further, the resource region may be indicated in units of a CCE.

Further, when the DCI is received on a PDCCH other than a short PDCCH, the downlink data may be received in the first TTI and the second TTI based on a rate-matching mode signaled by a higher layer.

Further, the first TTI and the second TTI may be short TTIs.

According to another embodiment of the disclosure, a method of transmitting downlink data by a BS in a wireless communication system includes transmitting DCI in a first TTI, the DCI including rate-matching information for the downlink data, and transmitting the downlink data in the first TTI and a second TTI subsequent to the first TTI based on the rate-matching information. The DCI is for scheduling repeated transmissions of the downlink data in a plurality of TTIs, and the first TTI and the second TTI are included in the plurality of TTIs.

According to another embodiment of the disclosure, a UE for receiving downlink data in a wireless communication system includes a transceiver and at least one processor coupled to the transceiver. The at least one processor controls the transceiver to receive DCI in a first TTI, the DCI scheduling repeated transmissions of downlink data in a plurality of TTIs, obtains rate-matching information for the downlink data from the DCI, and controls the transceiver to receive the downlink data in the first TTI and a second TTI subsequent to the first TTI based on the rate-matching information. The first TTI and the second TTI are included in the plurality of TTIs.

According to another embodiment of the disclosure, a base station (BS) for transmitting downlink data in a wireless communication system includes a transceiver and at least one processor coupled to the transceiver. The at least one processor controls the transceiver to transmit DCI in a first TTI, the DCI including rate-matching information for the downlink data, and controls the transceiver to transmit the downlink data in the first TTI and a second TTI subsequent to the first TTI based on the rate-matching information. The DCI is for scheduling repeated transmissions of the downlink data in a plurality of TTIs, and the first TTI and the second TTI are included in the plurality of TTIs.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system. In addition, while the embodiments of the present disclosure are described in the context of frequency division duplexing (FDD), they are also readily applicable to half-FDD (H-FDD) or time division duplexing (TDD) with some modifications.

Figure 1:
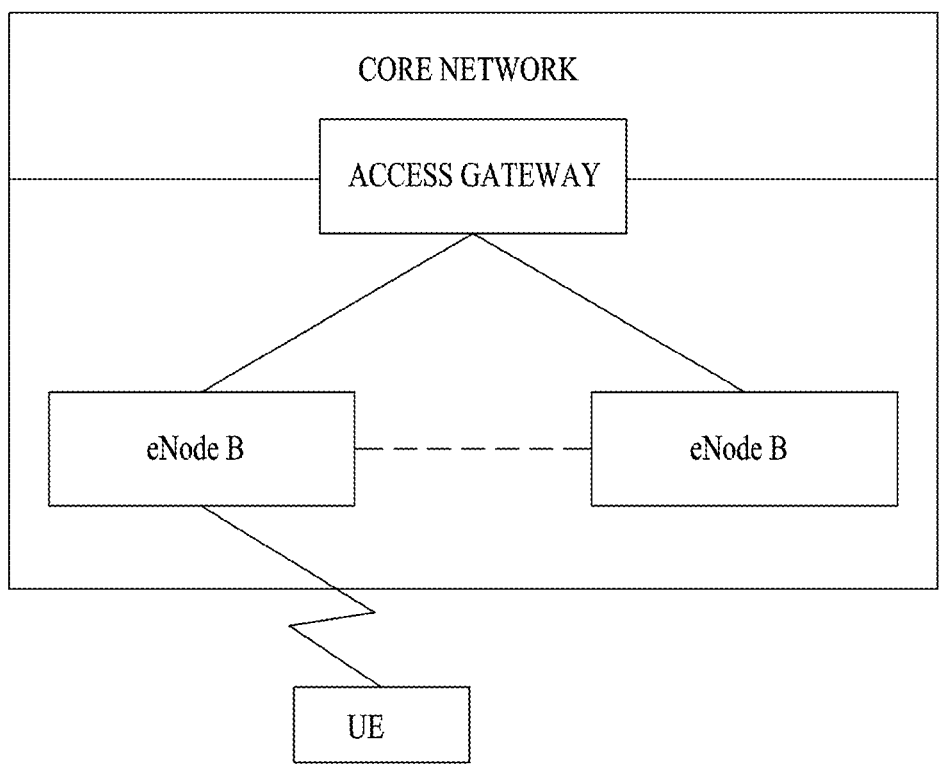
FIG. 1 illustrates a configuration of an evolved universal mobile telecommunications system (E-UMTS) network as an example of a wireless communication system.
Figure 2:
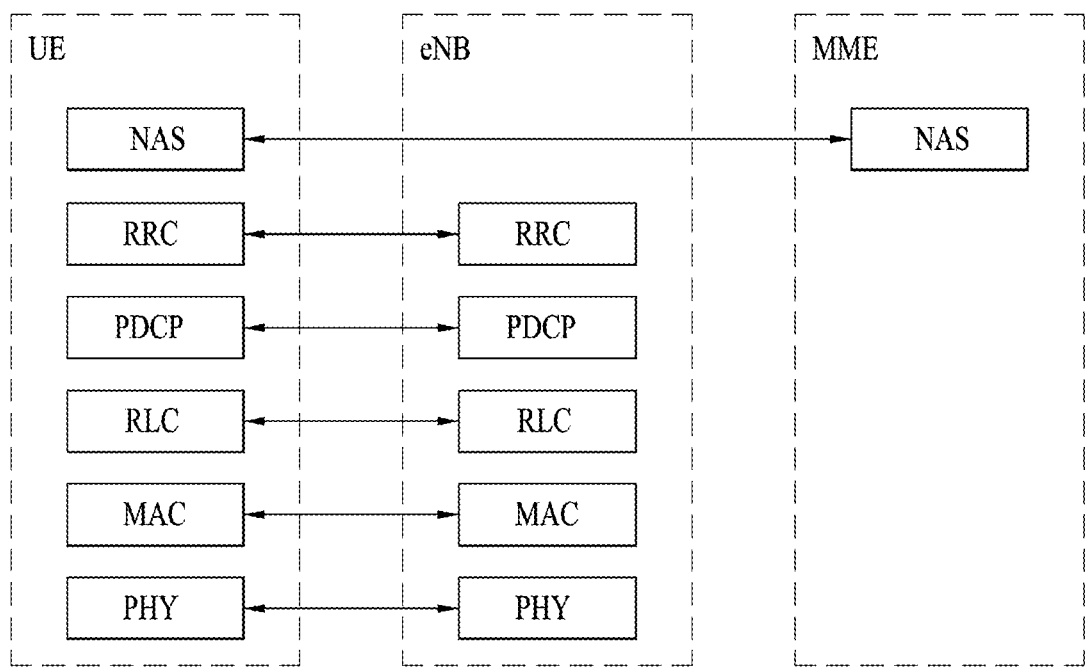
FIG. 2 illustrates a control-plane protocol stack and a user-plane protocol stack in a radio interface protocol architecture conforming to a $3^{rd}$ generation partnership project (3GPP) radio access network standard between a user equipment (UE) and an evolved UMTS terrestrial radio access network (E-UTRAN)
Figure 2:
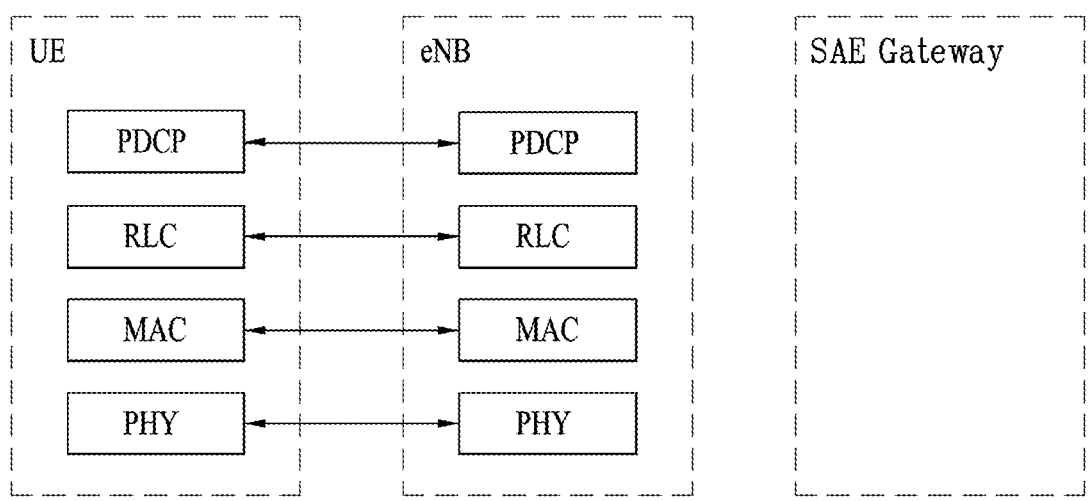

FIG. 2 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at Layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at Layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A non-access stratum (NAS) layer above the RRC layer performs functions including session management and mobility management.

One cell managed by an eNB is set to one of the bandwidths of 1.25, 2.5, 5, 10, 15, and 20 MHz and provides DL or UL transmission service to a plurality of UEs in the bandwidth.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a common control channel (CCCH), a multicast control channel (MCCH), a multicast traffic channel (MTCH), etc.

Figure 3:
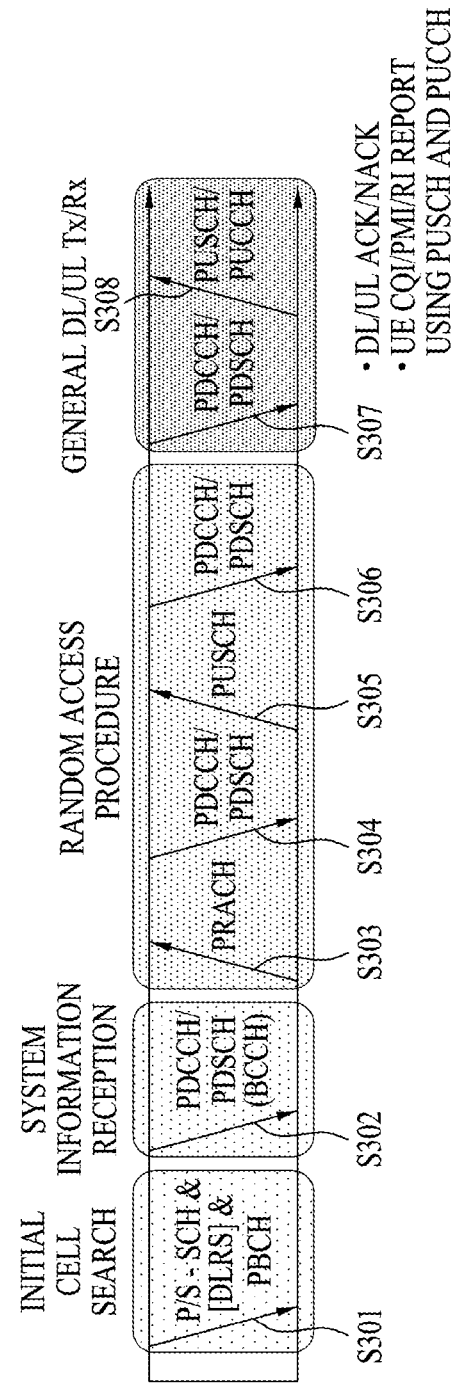
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a physical random access channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a physical uplink shared channel (PUSCH) and/or a physical uplink control channel (PUCCH) to the eNB (S308), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 4:
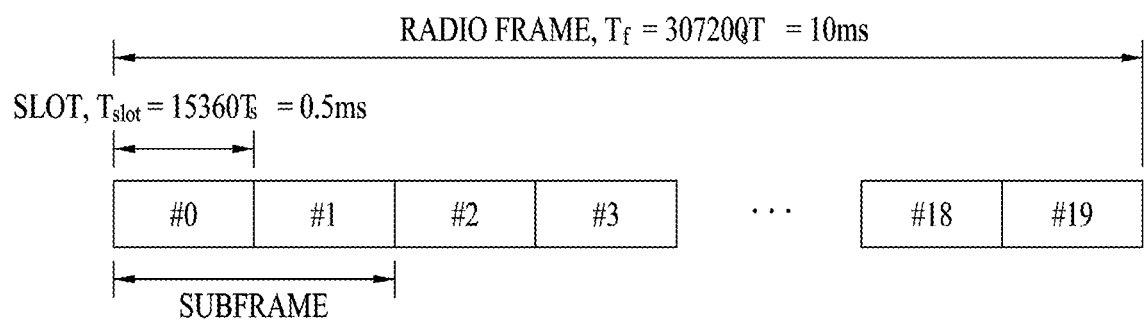
FIG. 4 illustrates the structure of a radio frame in a long term evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of orthogonal frequency division multiplexing (OFDM) symbols or SC-FDMA symbols in the time domain by a plurality of resource blocks (RBs) in the frequency domain. In the LTE system, one RB includes 12 subcarriers by 7 (or 6) OFDM symbols. A unit time during which data is transmitted is defined as a transmission time interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
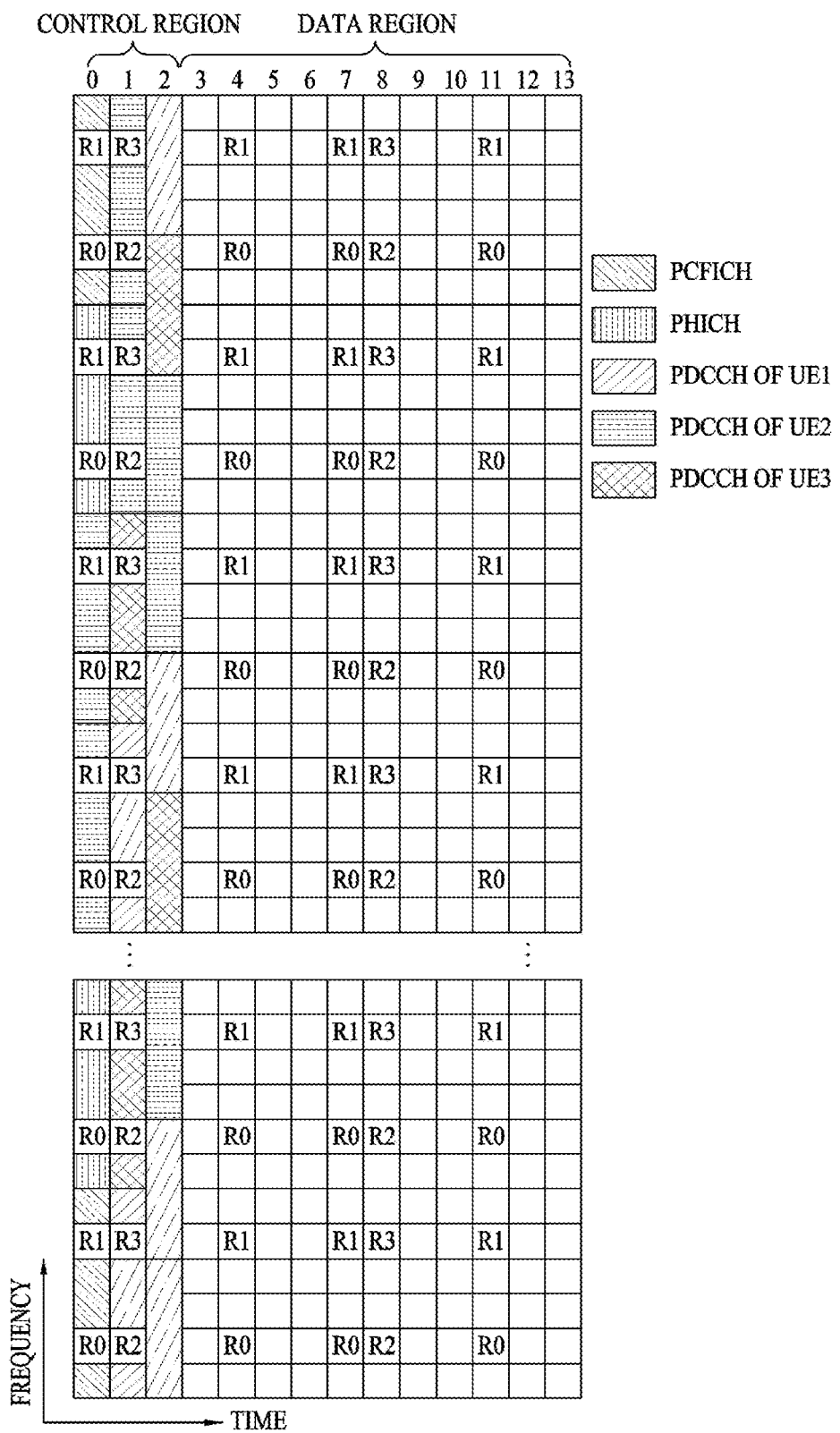
FIG. 5 illustrates the structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid ARQ indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 resource element groups (REGs), each REG being distributed to the control region based on a cell identity (ID). One REG includes 4 resource elements (REs). An RE is a minimum physical resource defined by one subcarrier by one OFDM symbol. The PCFICH is set to 1 to 3 or 2 to 4 according to a bandwidth. The PCFICH is modulated in quadrature phase shift keying (QPSK).

The PHICH is a physical hybrid automatic repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a spreading factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more control channel elements (CCEs). The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
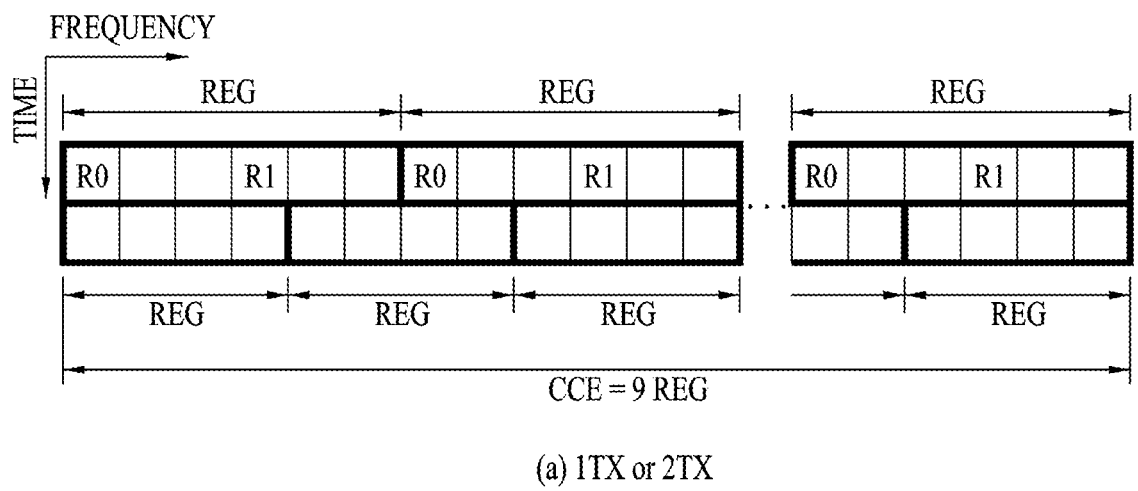
FIG. 6 illustrates resource units used to configure a downlink control channel in the LTE system.
Figure 6:
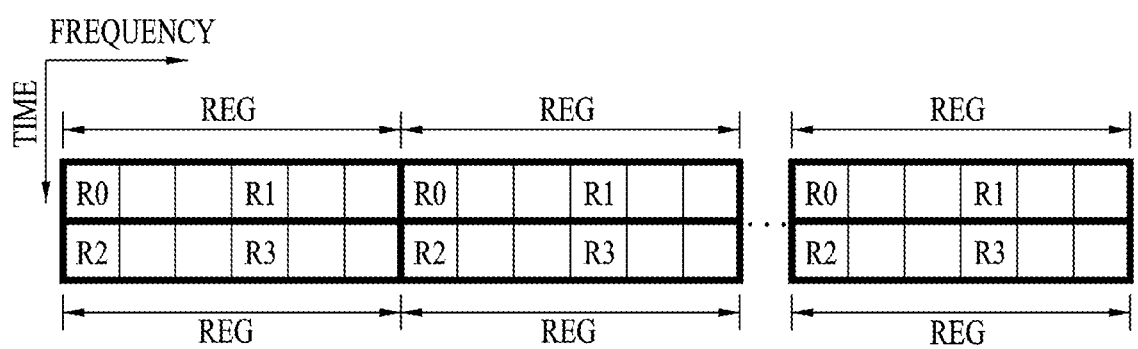

FIG. 6 illustrates resource units used to configure a downlink control channel in LTE. FIG. 6(a) illustrates a case in which the number of transmit (Tx) antennas is 1 or 2 and FIG. 6(b) illustrates a case in which the number of Tx antenna is 4. Although a different RS pattern is used according to the number of Tx antennas, REs are configured for a DL control channel in the same manner.

Referring to FIG. 6, a basic resource unit of a DL control channel is an REG. The REG includes four contiguous REs except for REs carrying RSs. REGs are marked with bold lines in FIG. 6. A PCFICH and a PHICH include 4 REGs and 3 REGs, respectively. A PDCCH is configured in units of a CCE, each CCE including 9 REGs.

To determine whether a PDCCH including L CCEs is transmitted to a UE, the UE is configured to monitor $M^{(L)}$ (≥L) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 7:
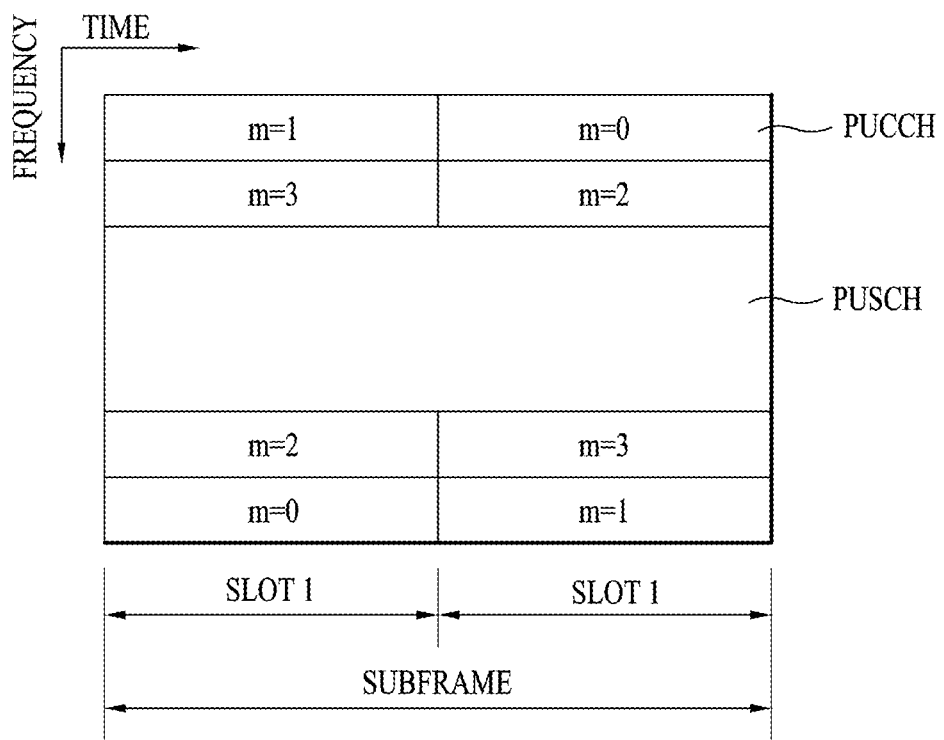
FIG. 7 illustrates the structure of an uplink subframe in the LTE system.

FIG. 7 illustrates a structure of a UL subframe in the LTE system.

Referring to FIG. 7, a UL subframe may be divided into a control region and a data region. A physical uplink control channel (PUCCH) including uplink control information (UCI) is allocated to the control region and a physical uplink shared channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for multiple input multiple output (MIMO), a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 7.

Now, a description will be given below of a method of transmitting and receiving a DL data channel according to the present disclosure.

In a next-generation communication system, methods of achieving very low latency and very high reliability in transmitting and receiving information are under consideration. For this purpose, a method of efficiently providing services having target quality of service (QoS) requirements by configuring various target QoS requirements such as latency and/or reliability, and performing a different operation according to each target QoS requirement is considered.

The present disclosure proposes a method of repeatedly transmitting DL data in a communication system designed to reduce latency and increase reliability.

While an invention and/or an embodiment of the present disclosure may be regarded as a proposed method, each combination of inventions and/or embodiments may also be regarded as a new method. Further, a specific invention is limited to neither an embodiment set forth in the present disclosure nor a specific system. That is, a specific invention may be extended from an embodiment set forth in the present disclosure within the scope that a person skilled in the art could easily derive. Embodiments of the present disclosure are applicable to various communication systems including LTE, LTE-A, LTE-Pro, new radio access technology (NR), and Institute of Electrical and Electronics Engineers (IEEE).

Further, in the present disclosure, all parameters, operations, each combination of parameters and/or operations, whether a parameter and/or an operation is applied, and/or whether each combination of parameters and/or operations is applied may be indicated to a UE by an eNB through higher-layer signalling and/or physical-layer signalling, or predefined in the system.

Further, a TTI described herein may correspond to various TTI length units such as subslot, slot, and subframe.

A subslot and a slot may be referred to as a short TTI (sTTI). That is, an sTTI may include a subslot and a slot. The short TTI is defined as a TTI of a length shorter than a 1-ms DL-SCH and a 1-ms UL-SCH, and control channels supporting the short TTI, short PDCCH (sPDCCH) and short PUCCH (sPUCCH) are transmitted during a shorter duration than 1 ms. Herein, a slot is 0.5 ms in duration and thus may include 7 symbols. A subslot may include two or three symbols.

Further, an sTTI-based transmission may be performed on a slot basis in a TDD system, and an sTTI-based transmission may be performed on a slot basis and/or on a subslot basis in an FDD system.

Figure 8:
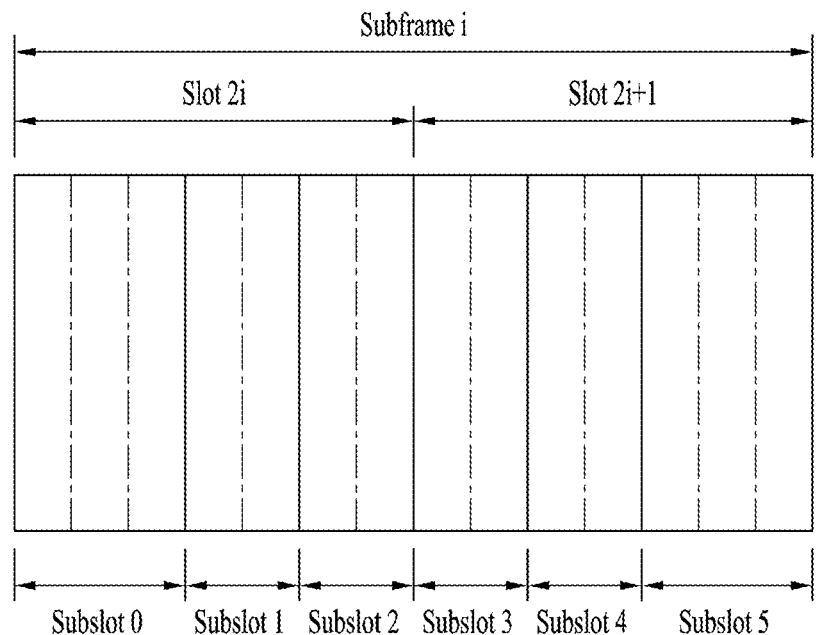
FIG. 8 is a diagram illustrating the structure of a short transmission time interval (sTTI)
Figure 8:
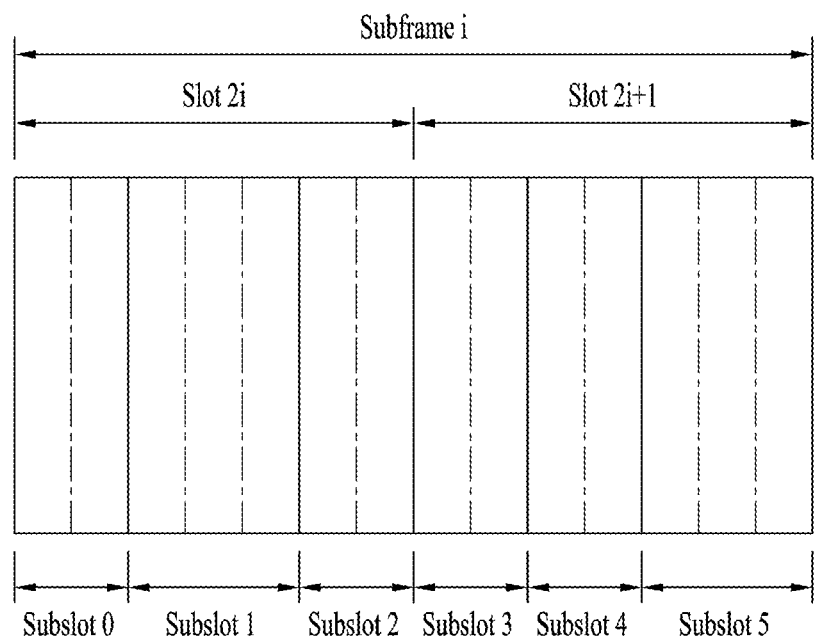

One subframe may include 6 subslots, and have a different subslot arrangement pattern according to the number of symbols used for a PDCCH. Specifically, if the PDCCH occupies one or three symbols, each of subslot 0 and subslot 5 includes three symbols, and each of the remaining slots includes two symbols, as illustrated in FIG. 8(a). If the PDCCH occupies two symbols, each of subslot 1 and subslot 5 includes three symbols, and each of the remaining slots includes two symbols, as illustrated in FIG. 8(b).

To increase the reliability of DL transmission, DL data may be repeatedly transmitted. For example, as illustrated in FIG. 10(a), a control channel and a data channel scheduled by the control channel may be transmitted independently in each TTI. Herein, it may be indicated to a UE that data channels transmitted in a plurality of TTIs deliver the same transmission block (TB) by an HARQ process number, a new data indicator (NDI), and so on in each control channel, and the same data may be repeatedly transmitted in the plurality of TTIs.

Figure 9:
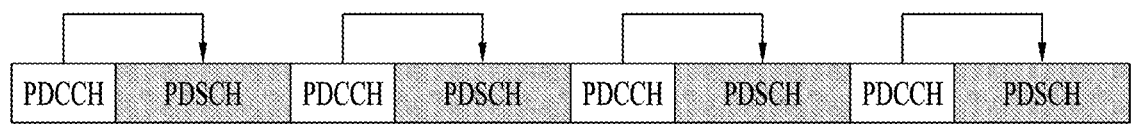
FIG. 9 is a diagram illustrating exemplary schedulings of a repeatedly transmitted physical downlink shared channel (PDSCH)
Figure 9:
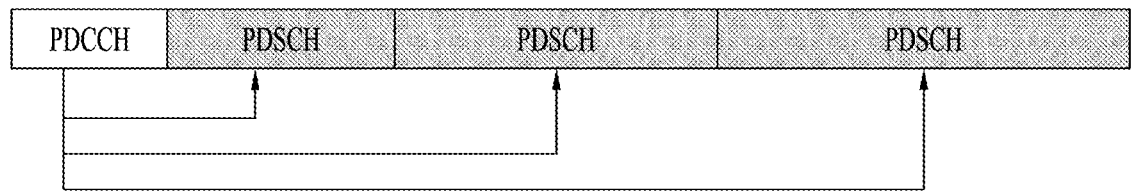

To reduce the overhead of a control channel relative to the illustrated case of FIG. 9(a), a control channel transmitted in a single TTI may schedule data repeatedly transmitted in multiple TTIs, as illustrated in FIG. 9(b). That is, a control channel transmitted in a single TTI may be schedule data in multiple TTIs.

As such, a control channel may be transmitted in a plurality of TTIs. The number of TTIs in which the control channel is transmitted may be smaller than that of TTIs in which a data channel is transmitted. Information such as a modulation coding scheme (MCS)/resource allocation (RA) in DCI that schedules repeated data transmissions in multiple TTIs may be applied commonly to all of the TTIs in which the data is repeatedly transmitted. Further, the DCI may include information about the repetition number of the data.

The above-described method may be performed based on a short TTI as in the LTE sTTI system, such that latency is reduced and reliability is increased. In the sTTI-based system, because one TTI has a limited amount of resources, data may be transmitted multiplexed even in a control channel to minimize resource waste.

In the LTE sTTI system, for example, an eNB may signal rate-matching information, which is used to transmit data on a control channel, to a UE by higher-layer signaling and/or physical-layer signaling.

Figure 10:
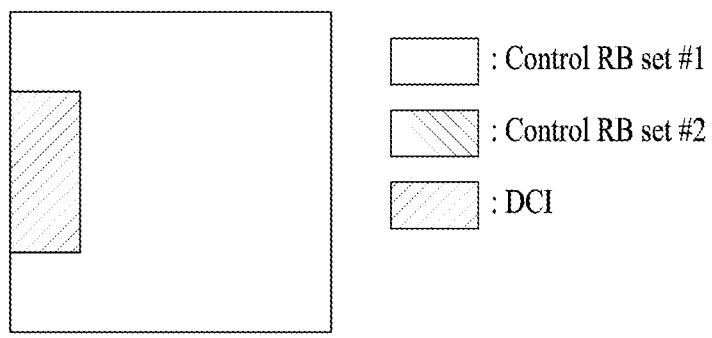
FIG. 10 is a diagram illustrating embodiments of a rate-matching method according to the present disclosure.
Figure 10:
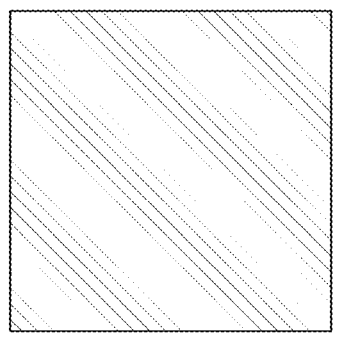
Figure 10:
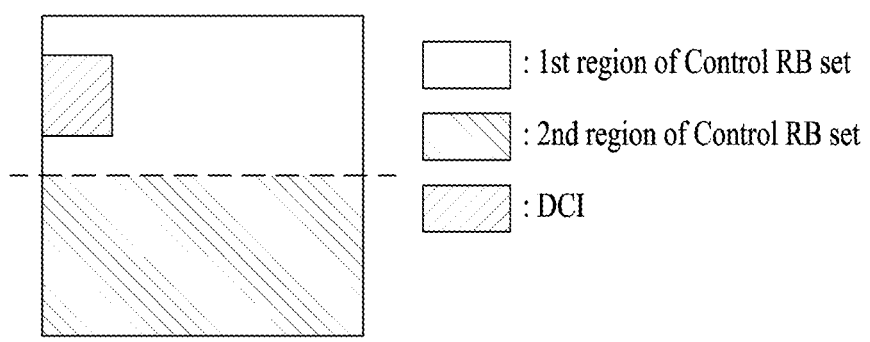

Referring to FIG. 10 as a specific example, rate-matching information that an eNB transmits to a UE will be described below.

The eNB may configure one or two control RB sets for the UE. FIG. 10(a) illustrates an example of configuring two control RB sets for a UE, and FIG. 10(b) illustrates an example of configuring one control RB set for a UE.

The eNB may indicate to the UE whether data may be mapped to the configured control RB set(s) by higher-layer signaling and/or physical-layer signaling.

For example, the eNB may indicate a control RB set to which data may be mapped or a specific region to which data may be mapped in the control RB set to the UE by DCI. When two control RB sets are configured for the UE as illustrated in FIG. 10(a), the eNB may indicate a control RB set available for data transmission between control RB set #1 and control RB set #2 to the UE by 2-bit information for rate-matching included in DCI in the form of a bitmap. When this scheme is applied to FIG. 10(b), the eNB may divide the one control RB set configured for the UE into a first region and a second region and indicate which region is available for data transmission to the UE by 2-bit information in DCI.

Even when two control RB sets are configured for the UE as illustrated in FIG. 10(a), each or one of the control RB sets may be divided into a first region and a second region and a region available for data transmission between the two regions may be indicated to the UE by 2-bit information included in DCI in the manner of FIG. 10(b).

The eNB may indicate to the UE by higher-layer signaling whether the two bits of the rate-matching information are used to indicate rate-matching information for each of the two control RB sets or for two regions divided from one control RB set.

The BS may indicate this rate-matching information to the UE by higher-layer signaling, not DCI. For example, the BS may indicate to the UE by higher-layer signaling whether to rate-match only a region in which DCI has been detected, a whole control RB set in which the DCI has been detected, or a whole control RB set in which the DCI has not been detected. This operation will be described later.

In the system in which data is transmitted multiplexed in a control channel, when a control channel schedules a plurality of data channels as illustrated in FIG. 9(b), rate-matching information for a TTI that does not carry the control channel is not transmitted in the TTI, and thus how to determine whether data is rate-matched in the TTI becomes an issue.

In this context, the present disclosure proposes a method of transmitting data in a TTI in which a control channel is not transmitted or in a TTI in which the control is transmitted but discarded by the UE, that is, a method of rate-matching data in the TTI, in the case where data is repeatedly transmitted in a plurality of TTIs.

Before embodiments of applying rate-matching are described, overall operations of a UE, a BS, and a network according to embodiments of the present disclosure will be described below.

Figure 11:
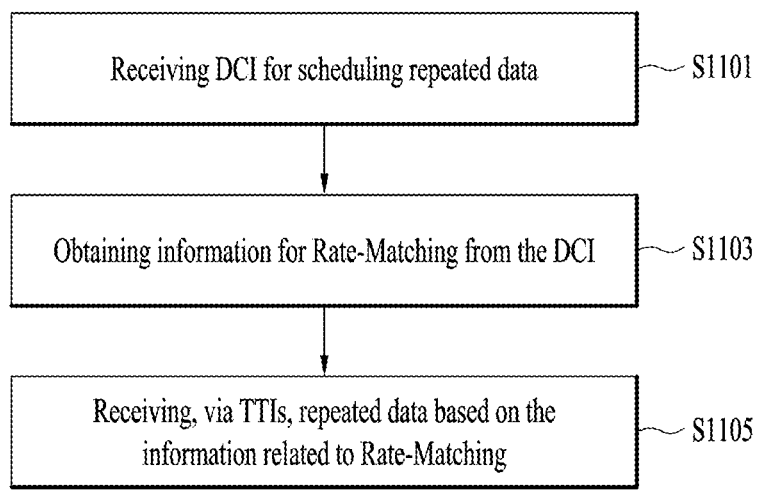
FIGS. 11, 12 and 13 are diagrams illustrating operations of a UE, a base station (BS), and a network according to the present disclosure.
Figure 12:
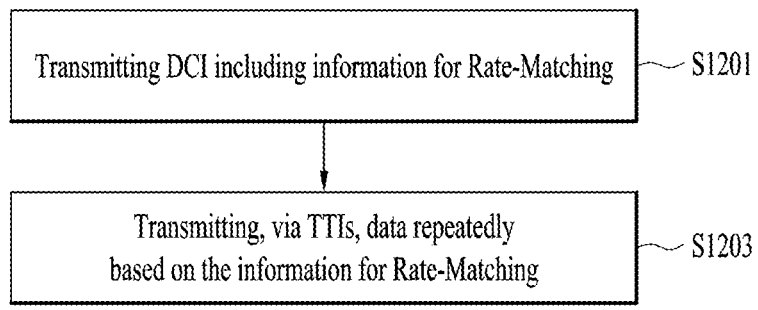
Figure 13:
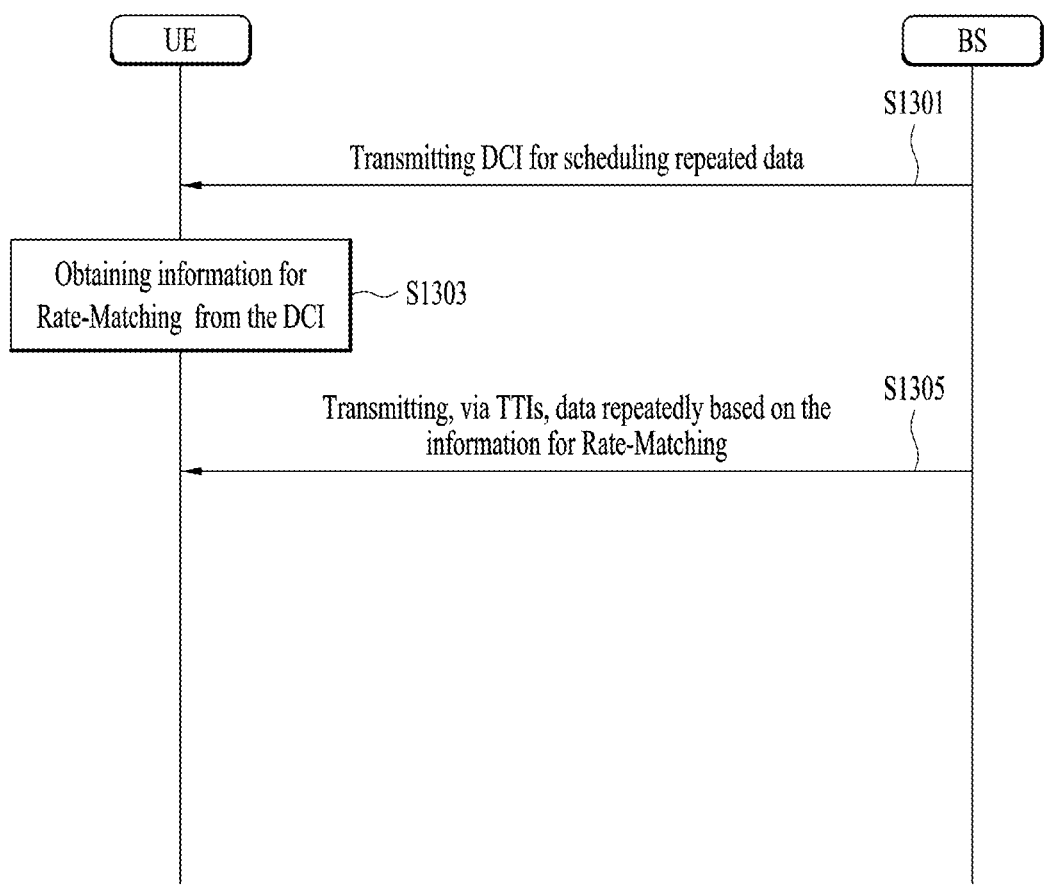

FIGS. 11, 12, and 13 are diagrams illustrating overall operations of a UE, a BS, and a network according to embodiments of the present disclosure. Referring to FIG. 11, a UE operation according to an embodiment of the present disclosure will be described. The UE receives DCI that schedules repeated transmissions of data from a BS (S1101) and obtains rate-matching information from the DCI (S1103). The UE receives the repeatedly transmitted data based on the rate-matching information in all or a part of a plurality of TTIs in which the data is repeatedly transmitted (S1105). How to use the rate-matching information obtained from the DCI in receiving and/or decoding the repeatedly transmitted data by the UE may be based on specific embodiments described later.

Referring to FIG. 12, the above operation will be described from the viewpoint of a BS. The BS transmits rate-matching information in DCI that schedules repeated transmissions of data to a UE (S1201). The BS then transmits the data repeatedly by applying the rate-matching information to all or a part of a plurality of TTIs (S1203). A specific method of rate-matching the repeatedly transmitted data by using the rate-matching information at the BS may be based on embodiments described later.

Referring to FIG. 13, the operation will be described from the viewpoint of a network. A BS transmits rate-matching information in DCI that schedules repeated transmissions of data to a UE (S1301). Upon receipt of the DCI, the UE obtains the rate-matching information from the DCI (S1303). The BS repeatedly transmits the data by applying the rate-matching information to all or a part of a plurality of TTIs, and the UE receives the repeatedly transmitted data by using the rate-matching information in all or a part of the plurality of TTIs in which the data is repeatedly transmitted (S1305). A specific method of receiving and/or rate-matching the repeatedly transmitted data by using the rate-matching information at the BS and/or the UE may be based on embodiments described below.

Now, a description will be given of a method of using rate-matching information obtained from DCI in a plurality of TTIs in which data is repeatedly transmitted.

According to an embodiment, rate-matching information included in DCI which has been successfully decoded and thus detected may be applied only to a TTI in which the DCI has been transmitted, while data may be transmitted by rate-matching and/or puncturing all or a part of control RB sets configured in the remaining TTIs in which the same data scheduled by the DCI is repeatedly transmitted.

Alternatively, the rate-matching information included in the DCI which has been successfully decoded and thus detected may be applied only to the TTI in which the DCI has been transmitted, while the data may be transmitted without rate-matching and/or puncturing in all or a part of the control RB sets configured in the remaining TTIs in which the same data scheduled by the DCI is repeatedly transmitted.

Alternatively, the BS may indicate to the UE by higher-layer signaling and/or physical-layer signaling whether rate-matching is performed in the remaining TTIs in which the same data scheduled by DCI in a specific TTI is repeatedly transmitted, that is, whether rate-matching is performed for all or a part of control RB sets configured in the remaining TTIs. A part of control RB set(s) may refer to the entirety of a part of a plurality of control RB sets when the plurality of control RB sets are configured, or a part of a single control RB set, Further, a part of control RB set(s) may be defined in the physical domain or in a logical domain such as a CCE.

Alternatively, the BS may indicate to the UE by higher-layer signaling and/or physical-layer signaling, how to perform rate-matching and/or puncturing in the remaining TTIs in which the same data is repeatedly transmitted, without transmitting DCI. In this case, a control RB set and/or a part of a control RB set to be subjected to rate-matching and/or puncturing may be indicated by higher-layer signaling and/or physical-layer signaling, as described before with reference to FIG. 10. More specifically, the positions of resources to be rate-matched and/or punctured may be indicated.

The rate-matching information included in the DCI which has been successfully decoded and thus detected may be applied commonly to all of the TTIs in which the data scheduled by the DCI is repeated transmitted as well as the TTI in which the DCI has been transmitted. Applying the same rate-matching information to all repetitions of a PDSCH may imply that resources at the same positions as resources not used for PDSCH mapping in the TTI in which the DCI has been transmitted are not used for PDSCH mapping in the TTIs in which the PDSCH is repeated, subsequent to the TTI carrying the DCI.

When rate-matching information included in detected DCI is applied commonly to all TTIs in which data scheduled by the DCI is repeatedly transmitted as described above, the DCI may be configured to include the same number of bits as in the case of transmitting rate-matching information applied only to a TTI in which DCI is transmitted. Accordingly, this method may be advantageous in that there is no need to use additional bits to indicate rate-matching information for TTIs in which data is repeatedly transmitted, except for a TTI in which DCI is transmitted.

Further, because DCI transmitted in each of the TTIs in which the data is repeatedly transmitted may include the same rate-matching information, even though DCI detection is failed in a specific TTI, the DCI may be detected in a subsequent TTI. Therefore, the same information may advantageously be obtained.

As described before with reference to FIG. 10, the rate-matching information may indicate the whole or a part of a control RB set unit or indicate a unit in a search space. For example, the unit in a search space may be a CCE.

Further, the BS may indicate rate-matching information for data transmission on a control channel to the UE by higher-layer signaling and/or physical-layer signaling in the LTE sTTI system.

For example, the BS may rate-match only DCI that schedules data by higher-layer signaling (Mode 1) or a whole control RB set (Mode 2) in FIGS. 10(a) and 10(b).

Further, the BS may rate-match a whole control RB set in which DCI is detected, like control RB set #1 in FIG. 10(a) (Mode 3) or a whole control RB set in which DCI is not detected, like control RB set #2 in FIG. 10(a) (Mode 4).

When information included in DCI transmitted on a control channel in a specific TTI schedules a plurality of TTIs in which the same data is repeatedly transmitted as described above, it may be expected that none of Mode 1 to Mode 4 are configured or that a part of Mode 1 to Mode 4 are not configured. For example, it may not be expected that Mode 1 and Mode 3 are configured.

More generally, in the case where the BS transmits rate-matching information to the UE by higher-layer signaling and/or physical-layer signaling, when DCI in a specific TTI schedules a plurality of TTIs in which the same data is repeatedly transmitted, it may not be expected that all or some of rate-matching configurations receivable by higher-layer signaling and/or physical-layer signaling are configured.

Scheduling a plurality of TTIs in which the same data is repeatedly transmitted by information included in DCI may amount to scheduling the TTIs including a TTI in which the DCI is transmitted or scheduling the TTIs except for the TTI in which the DCI is transmitted.

Further, the BS may indicate rate-matching information to the UE by physical-layer signaling. For example, as described with reference to FIG. 10, the rate-matching information may be indicated by bits included in DCI. In this case, the UE may expect that data has been rate-matched, assuming a specific bit predefined in the system or configured by higher-layer signaling and/or physical-layer signaling for the remaining TTIs in which the same data scheduled by DCI of a specific TTI is repeatedly transmitted.

Alternatively, when DCI in a specific TTI schedules a plurality of TTIs in which the same data is repeatedly transmitted, the BS may separately provide rate-matching information applicable to the total TTIs and/or some TTIs to the UE by higher-signaling and/or physical-layer signaling.

The operation of the present disclosure may be applied differently to each subframe type such multimedia broadcast single frequency network (MBSFN) subframe/non-MBSFN subframe, each traffic type such as ultra-reliable, low latency communication (URLLC)/enhanced mobile broadband (eMBB)/massive machine type communication (mMTC), each TTI length, each TTI set including a plurality of TTIs, and/or each control RB set. Further, a different operation may be applied according to a data repetition number configuration. Further, in an embodiment of the present disclosure, when DCI in a specific TTI schedules a plurality of TTIs in which the same data is repeatedly transmitted, rate-matching information applied to the remaining TTIs in which the DCI is not transmitted may also be applied to the TTI in which the DCI is transmitted.

Figure 14:
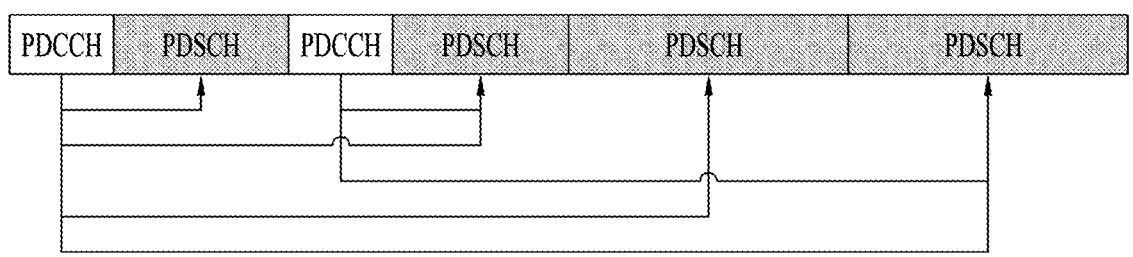
FIG. 14 is a diagram illustrating exemplary scheduling of repeated transmissions of data by a plurality of pieces of downlink control information (DCI)

For example, when DCI transmitted in a plurality of TTIs schedules a plurality of TTIs in which the same data is repeatedly transmitted as illustrated in FIG. 14, the TTIs in which the data is repeatedly transmitted may be rate-matched based on rate-matching information included in the last DCI. On the contrary, rate-matching may be performed for the TTIs in which the data is repeatedly transmitted based on rate-matching information included in the first DCI. The BS may indicate to the UE DCI including rate-matching information based on which rate-matching is performed for the TTIs in which the data is repeatedly transmitted by higher-layer signaling and/or physical-layer signaling.

It may be assumed that data in the first of TTIs in which the data is repeatedly transmitted or data in scheduled resources overlapping with resources to which detected DCI scheduling the data is mapped is rate-matched, and data in scheduled resources not overlapping with the resources to which the DCI is mapped or data transmitted in the other sTTIs except for the sTTI in which the DCI is transmitted is not rate-matched.

That is, when the UE discards duplicated DCI transmitted for the same HARQ process ID, rate-matching may not be performed for the discarded DCI. Alternatively, resources at the same position may be rate-matched in all TTIs in which data is repeatedly transmitted. For example, for all TTIs, rate-matching may be applied to a region corresponding to the same resources as CCE resources corresponding to DCI transmitted in the first TTI. This is because the BS may transmit DCI scheduling repeated transmissions of the same data a plurality of times in different TTIs in consideration of the reliability of a control channel, and thus rate-matching needs to be applied in consideration of resources available for DCI transmission in each TTI.

More generally, as in the LTE sTTI system, one of a plurality of modes may be set by higher-layer signaling. For example, when Mode 1 is set, resources in which DCI scheduling repeated transmissions of data is detected in the first of TTIs in which the data is repeatedly transmitted may be rate-matched across all of the TTIs in which the data is repeated transmitted.

Rate-matching may be applied only to the TTI in which the DCI scheduling the repeated transmissions of the data is transmitted (e.g., the first TTI) among the TTIs in which the data is repeatedly transmitted, or the resources at the same position (e.g., resources in each TTI, at the same position of CCE resources corresponding to the DCI transmitted in the first TTI) may be rate-matched across all of the TTIs in which the data is repeatedly transmitted.

The above operations are useful when the network does not repeatedly transmit DCI and when the network repeatedly transmits DCI, respectively. Therefore, when the network configures Mode 1, the network may indicate whether a rate-matching method corresponding to Mode 1 is applied only to the first TTI or resources overlapping with resources to which DCI is mapped among resources allocated to data, or to all (s)TTIs/(s)PDSCHs, by higher-layer signaling.

Alternatively, when Mode 1 is set, control/data sharing is allowed dynamically, and thus a dynamic control/data sharing bit is enabled, or when a specific state is indicated, resources for DCI may be rate-matched repeatedly, and otherwise, only data resources overlapping with the DCI resources or the first (s)TTI may be rate-matched.

Alternatively, even though Mode 1 is not set, the UE naturally expects rate-matching for DCI that schedules data for the UE. Accordingly, when Mode 1+repetition is configured semi-statically and a state enabling Mode 1+repetition is set, the UE may assume that an option of applying rate-matching to the same resources in all (s)TTIs/(s)PDSCHs is always used.

A repeated transmission of the data in the same TTI in which the DCI is detected may be punctured.

Further, the UE may operate as indicated by a rate-matching-related field included in DCI, for example, a Used/Unused SPDCCH resource indication field defined in DCI of the LTE sTTI system in a TTI in which the DCI is transmitted, whereas the UE may puncture data in the remaining TTIs in which the data is repeated transmitted, that is, in TTIs in which the UE does not attempt to decode the DCI or the UE attempts to decode the DCI but discard the DCI.

Alternatively, the above-described rate-matching operation may be applied for each control RB set carrying the DCI as well as resources carrying the DCI. For example, the rate-matching operation may be applied to all of one or more control RB sets, or on a single control RB set basis. The single control RB set may be determined depending on whether DCI is transmitted in the control RB set.

More generally, one of a plurality of modes may be set by higher-layer signaling as in the LTE sTTI system. For example, when Mode 3 is set, it may be indicated that a whole control RB set in which DCI scheduling repeated transmissions of data is detected is rate-matched in the first of TTIs in which the data is repeatedly transmitted. This rate-matching operation may be applied only to the TTI in which the DCI scheduling the repeated transmissions of the data (e.g., the first TTI) among the TTIs in which the data is repeatedly transmitted or to resources at the same position (e.g., the resources of the control RB set including the DCI in the first TTI) over all of the TTIs in which the data is repeatedly transmitted.

This rate-matching operation may be predefined in the system or indicated to the UE by higher-layer signaling and/or physical-layer signaling from the BS. Further, the above embodiment may be implemented based on the same principle for the other modes, not limited to the above-described mode. Further, in the case where rate-matching is performed for a control RB set, the resources of a control RB set configured in each sTTI may be rate-matched. Even when it is configured that the resources of the DCI scheduling data are rate-matched over all (s)TTIS/(s)PDSCHs, if a control RB set for an (s)TTI carrying the DCI scheduling the data is different from control RB sets in (s)TTIs carrying the repeatedly transmitted data except for the (s)TTI carrying the DCI, the control RB sets of the (s)TTIs carrying the repeatedly transmitted data except for the (s)TTI carrying the DCI may not be rate-matched regardless of whether rate-matching has been configured. That is, it may be assumed that the same resources are rate-matched only in (s)TTIs configured with the same control RB set.

Further, a different rate-matching operation may be defined depending on the presence or absence of the field related to rate-matching included in DCI, for example, the Used/Unused SPDCCH resource indication field defined in DCI of the LTE sTTI system. For example, in the absence of the rate-matching-related field in DCI, the UE may operate as indicated by higher-layer signaling from the BS.

More specifically, for example, when inclusion of the rate-matching-related field in the DCI is not configured by higher-layer signaling or DCI scheduling repeated transmissions of data is not transmitted on and/or mapped to an SPDCCH in the LTE sTTI system, the UE may use a rate-matching mode indicated by higher-layer signaling, that is, RRC signaling in the LTE sTTI system. The case in which DCI scheduling repeated transmissions of data is not transmitted on and/or mapped to an SPDCCH may be a case in which DCI is transmitted on and/or mapped to a PDCCH, not an SPDCCH.

In other words, for example, when DCI is transmitted on and/or mapped to a PDCCH and Mode 2 is set as a rate-matching mode by higher-layer signaling, control RB sets configured in TTIs in which data is repeatedly transmitted may be rate-matched according to Mode 2. That is, the data may not be transmitted in the control RB sets configured in the repeatedly transmitted TTIs.

Alternatively, in the presence of the rate-matching-related field in the DCI, rate-matching may be applied only to the TTI in which the DCI is received, according to the DCI, while rate-matching may be applied to the remaining TTIs according to higher-layer signaling received from the BS. Alternatively, in the presence of the rate-matching-related field in the DCI, rate-matching may be applied according to an indication of the DCI in the remaining TTIs as well as the TTI in which the DCI is received. This rate-matching applying operation may be predefined in the system or indicated to the UE by higher-layer signaling and/or physical-layer signaling from the BS.

Figure 15:
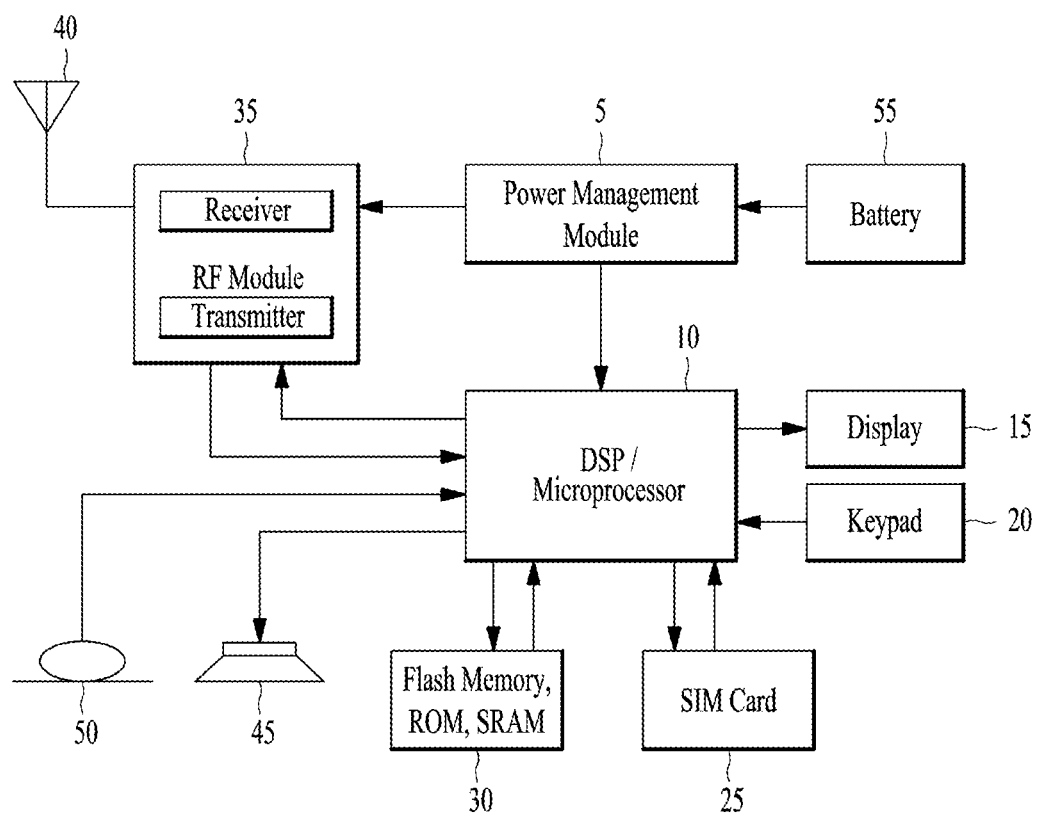
FIG. 15 is a block diagram illustrating components of a wireless device for implementing the present disclosure.

FIG. 15 illustrates an embodiment of a wireless communication device according to an implementation of the present disclosure.

The wireless communication device illustrated in FIG. 15 may be a UE and/or a BS according to an embodiment of the present disclosure. However, the wireless communication device of FIG. 15 may be any of various types of devices, such as a vehicle communication system or device, a wearable device, a laptop, a smartphone, and so on, not limited to the UE and/or the BS according to the present disclosure.

In the example of FIG. 15, the UE and/or the BS according to an implementation of the present disclosure may include at least one processor 10 such as a digital signal processor or a microprocessor, a transceiver 35, a power management module 5, an antenna 40, a battery 55, a display 15, a keypad 20, a memory 30, a subscriber identity module (SIM) card 25, a speaker 45, and a microphone 50. In addition, the UE and/or the BS may include one or more antennas. The transceiver 35 may be also referred to as a radio frequency (RF) module.

The at least one processor 10 may be configured to perform the functions, procedures and/or methods described with reference to FIGS. 1 to 14. In at least some of the embodiments described with reference to FIGS. 1 to 14, the at least one processor 10 may implement one or more protocols, such as layers of radio interface protocols (e.g., functional layers).

The memory 30 is coupled to the at least one processor 10 and stores information related to the operation of the at least one processor 10. The memory 30 may be located inside or outside of the at least one processor 10 and may be coupled to the at least one processor 10 by various techniques such as wired or wireless communication.

A user may input various types of information (for example, instruction information such as a telephone number) by various techniques such as pressing a button on the keypad 20 or activating voice using the microphone 50. The at least one processor 10 executes an appropriate function such as receiving and/or processing information of the user and dialing a telephone number.

Further, the at least one processor 10 may retrieve data (e.g., operational data) from the SIM card 25 or the memory 30 to execute the appropriate function. In addition, the at least one processor 10 may receive and process GPS information from a GPS chip to obtain location information about the UE and/or the BS, such as vehicle navigation, map service, or the like, or execute a function related to the location information. In addition, the at least one processor 10 may display these various types of information and data on the display 15 for reference and convenience of the user.

The transceiver 35 is coupled to the at least one processor 10 to transmit and/or receive radio signals, such as RF signals. The at least one processor 10 may control the transceiver 35 to initiate communication and transmit wireless signals including various types of information or data, such as voice communication data. The transceiver 35 may include a receiver for receiving a radio signal and a transmitter for transmitting a radio signal. The antenna 40 facilitates transmission and reception of radio signals. In some embodiments, upon receipt of a radio signal, the transceiver 35 may forward and convert the signal to a baseband frequency for processing at the at least one processor 10. The processed signal may be subjected to processes according to various techniques, such as being converted into audible or readable information, and such signals may be output via the speaker 45.

In some embodiments, a sensor may also be coupled to the at least one processor 10. The sensor may include one or more sensing devices configured to detect various types of information such as velocity, acceleration, light, vibration, and the like. The at least one processor 10 may receive and process the sensor information obtained from the sensor such as proximity, position, image, and the like, thereby performing various functions such as collision avoidance and autonomous driving.

Meanwhile, various components such as a camera, a USB port, and the like may further be included in the UE and/or the BS. For example, a camera may be further coupled to the at least one processor 10 and used for a variety of services such as autonomous driving, vehicle safety services, and the like.

FIG. 15 merely illustrates one example of a device which is a UE and/or a BS, not limiting the present disclosure. For example, some components, such as the keypad 20, the GPS chip, the sensor, the speaker 45 and/or the microphone 50 may be excluded, for implementation of the UE and/or the BS in some embodiments.

Specifically, a UE operation will be described below in the case where the wireless communication device illustrated in FIG. 15 is a UE according to an embodiment of the present disclosure, to implement the embodiments of the present disclosure. When the wireless communication device is a UE according to an embodiment of the present disclosure, the at least one processor 10 may control the transceiver 35 to receive DCI for scheduling repeated transmissions of data from a BS and obtains rate-matching information from the DCI. The at least one processor 10 may control the transceiver 35 to receive the repeatedly transmitted data, using the rate-matching information in all or a part of a plurality of TTIs in which the data is repeatedly transmitted. How to use the rate-matching information obtained from the DCI to receive and/or decode the repeatedly transmitted data by the UE may be determined based on the specific embodiments described before with reference to FIGS. 1 to 14.

Further, a BS operation will be described below in the case where the wireless communication device illustrated in FIG. 15 is a BS according to an embodiment of the present disclosure, to implement the embodiments of the present disclosure. When the wireless communication device is a BS according to an embodiment of the present disclosure, the at least one processor 10 may control the transceiver 35 to transmit DCI including rate-matching information, for scheduling repeated transmissions of data to a UE. The at least one processor 10 may then control the transceiver 35 to transmit data repeatedly by applying the rate-matching information to all or a part of a plurality of TTIs. A specific method of rate-matching repeatedly transmitted data based on rate-matching information by the BS may be determined based on the specific embodiments described before with reference to FIGS. 1 to 14.

As is apparent from the present disclosure, repeated transmissions of a DL data channel in a plurality of TTIs may be efficiently scheduled.

The method and apparatus for transmitting and receiving a DL data channel has been described above in the context of being applied to a 3GPP LTE system, by way of example. However, the method and apparatus are applicable to various wireless communication systems other than the 3GPP LTE system.

The embodiments described above are those in which the elements and features of the present disclosure are combined in a predetermined form. Each component or feature will be considered optional unless otherwise expressly stated. Each component or feature may be implemented in a form that is not combined with other components or features. It is also possible to construct embodiments of the present disclosure by combining some of the elements and/or features. The order of operations described in the embodiments of the present disclosure may be changed. Some configurations or features of certain embodiments may be included in other embodiments, or may be replaced with corresponding configurations or features of other embodiments. It is clear that the claims that are not expressly cited in the claims may be combined to form an embodiment or be included in a new claim by an amendment after the application.

The specific operation described herein as being performed by a BS may be performed by its upper node, in some cases. That is, it is apparent that various operations performed for communication with a UE in a network with a plurality of network nodes including a BS may be performed by the BS or by a network node other than the BS. A BS may be replaced by terms such as a fixed station, a Node B, an eNode B (eNB), an access point, and the like.

Embodiments of the present disclosure may be implemented by various means, for example, hardware, firmware, software or a combination thereof. In a hardware configuration, an embodiment of the present disclosure may be implemented with one or more application specific integrated circuits (ASICs), digital signal processors (DSPs), digital signal processing devices (DSPDs), programmable logic devices (PLDs) field programmable gate arrays, processors, controllers, microcontrollers, microprocessors, and the like.

In a firmware or software configuration, an embodiment of the present disclosure may be implemented in the form of a module, a procedure, a function, or the like for performing the functions or operations described above. The software code may be stored in a memory unit and executed by a processor. The memory unit may be located inside or outside the processor, and may exchange data with the processor by various well-known means.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

What is claimed is:

1. A method of receiving downlink data by a user equipment (UE) in a wireless communication system, the method comprising:
   receiving downlink control information (DCI) in a first transmission time interval (TTI), the DCI scheduling repeated transmissions of downlink data in a plurality of TTIs;
   obtaining rate-matching information for the downlink data from the DCI; and
   receiving the downlink data in the first TTI and a second TTI subsequent to the first TTI based on the rate-matching information,
   wherein the first TTI and the second TTI are included in the plurality of TTIs.

2. The method according to claim 1, wherein the rate-matching information is for informing a control resource block (RB) set to which the downlink data is not mapped.

3. The method according to claim 1, wherein the rate-matching information is for informing a resource region to which the downlink data is not mapped in a control RB set configured for the first TTI.

4. The method according to claim 3, wherein the resource region is informed in units of a control channel element (CCE).

5. The method according to claim 1, wherein when the DCI is received on a physical downlink control channel (PDCCH) other than a short PDCCH, the downlink data is received in the first TTI and the second TTI based on a rate-matching mode signaled by a higher layer.

6. The method according to claim 1, wherein the first TTI and the second TTI are short TTIs.

7. An apparatus for receiving downlink data in a wireless communication system, the apparatus comprising:
 a memory; and
 at least one processor coupled to the memory,
 wherein the at least one processor controls to:
  receive downlink control information (DCI) in a first transmission time interval (TTI), the DCI scheduling repeated transmissions of downlink data in a plurality of TTIs,
  obtain of rate-matching information for the downlink data from the DCI, and
  receive the downlink data in the first TTI and a second TTI subsequent to the first TTI based on the rate-matching information, and
 wherein the first TTI and the second TTI are included in the plurality of TTIs.

8. The apparatus according to claim 7, wherein the rate-matching information is for indicating a control resource block (RB) set to which the downlink data is not mapped.

9. The apparatus according to claim 7, wherein the rate-matching information is for indicating a resource region to which the downlink data is not mapped in a control RB set configured for the first TTI.

10. The apparatus according to claim 9, wherein the resource region is indicated in units of a control channel element (CCE).

11. The apparatus according to claim 7, wherein when the DCI is received on a physical downlink control channel (PDCCH) other than a short PDCCH, the downlink data is received in the first TTI and the second TTI based on a rate-matching mode signaled by a higher layer.

12. The apparatus according to claim 7, wherein the first TTI and the second TTI are short TTIs.

13. A method of transmitting downlink data by a base station (BS) in a wireless communication system, the method comprising:
 transmitting downlink control information (DCI) in a first transmission time interval (TTI), the DCI including rate-matching information for the downlink data; and
 transmitting the downlink data in the first TTI and a second TTI subsequent to the first TTI based on the rate-matching information,
 wherein the DCI is for scheduling repeated transmissions of the downlink data in a plurality of TTIs, and the first TTI and the second TTI are included in the plurality of TTIs.

* * * * *